July 24, 1923.
C. G. TURNGREN
VALVE LATHE
Filed Nov. 7, 1921
1,462,669
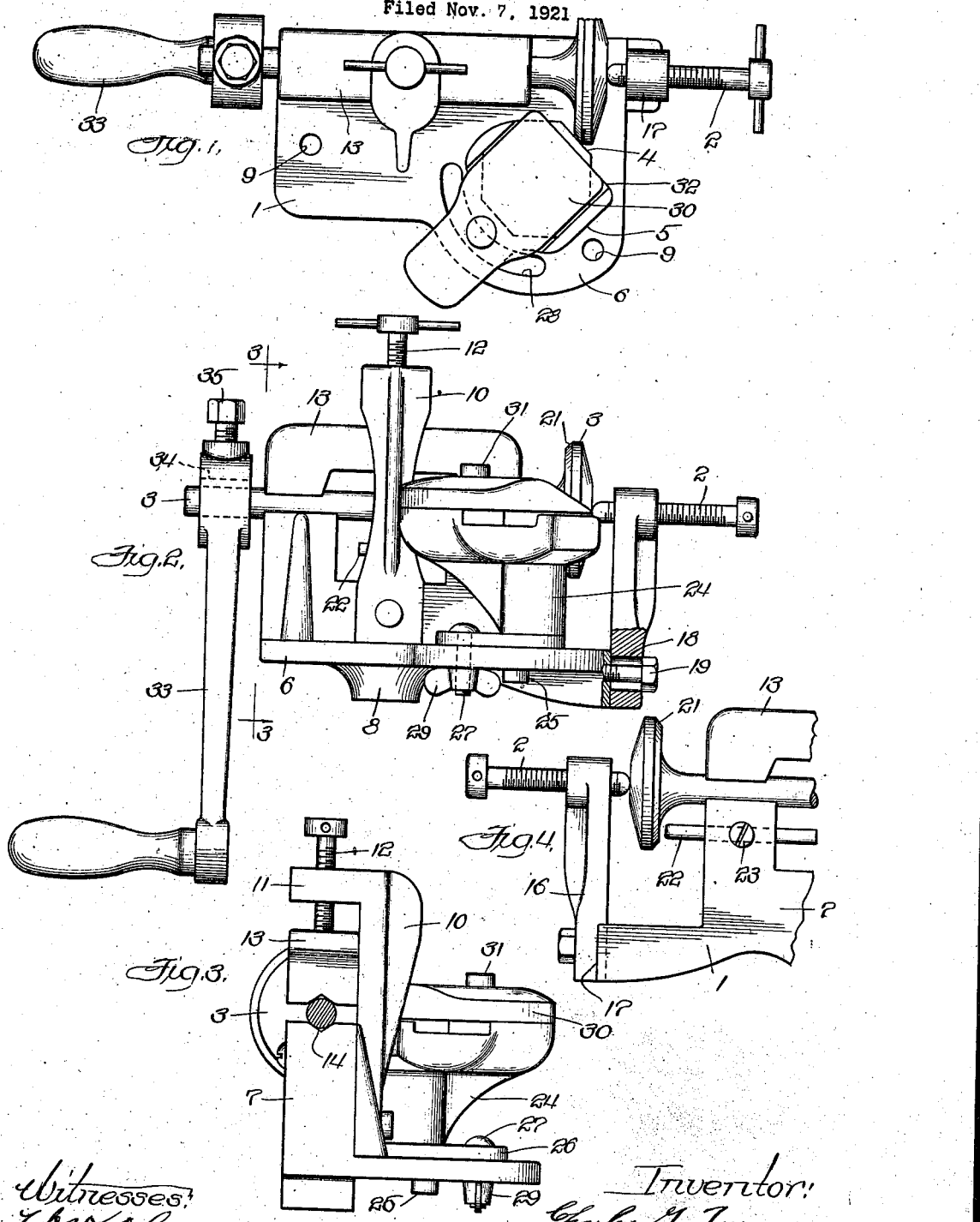

Patented July 24, 1923.

1,462,669

UNITED STATES PATENT OFFICE.

CHARLES G. TURNGREN, OF HARVEY, ILLINOIS.

VALVE LATHE.

Application filed November 7, 1921. Serial No. 513,375.

*To all whom it may concern:*

Be it known that I, CHARLES G. TURNGREN, a citizen of the United States of America, and a resident of Harvey, county of Cook and State of Illinois, have invented a new and useful Improvement in Valve Lathes, of which the following is a specification.

This invention relates to tools for refacing valves.

The main objects of this invention are to provide an improved form of valve refacing tool in the form of a small portable hand lathe having an improved form of holder for supporting the cutting tool; to provide an improved form of adjustable mounting for locating the feed screw in axial alinement with the valve; and to provide improved means for limiting the axial movement of the valve under the action of the feed screw.

An illustrative embodiment of this invention is shown in the accompanying drawings, wherein—

Figure 1 is a plan of the lathe, showing a valve supported therein.

Fig. 2 is a side elevation of the same.

Fig. 3 is a vertical section, taken on the line 3—3 of Fig. 2.

Fig. 4 is a fragmentary view in elevation, showing one end of the lathe.

The invention is shown embodied in a small portable hand lathe suitable for clamping in a vise or on a work bench and includes a body having a pair of coacting jaws arranged to form an adjustable bearing for rotatably and slidably supporting a valve to be faced. The valve is fed to the cutting tool by a feed screw which is adjustably mounted for movement radially of the valve so as to be readily shiftable into axial alinement with the valve stem. The cutting tool is carried by a holder which is arranged for adjustment so as to permit the cutting tool to be shifted to any desired angle with respect to the valve head. An improved form of adjustable stop is mounted on the body for limiting the inward axial movement of the valve so as to insure against cutting of the valve face beyond the required depth.

In the form shown, the lathe comprises a body 1, having mounted thereon an adjustable feed screw 2, arranged to feed a rotatably supported valve 3 into engagement with a cutting tool 4 supported in an improved form of holder 5.

The body 1 includes a base 6, having integrally formed thereon an upright Ushaped member forming a stationary jaw 7. The base 6 has a depending lug 8 arranged to be clamped in a vise, and extending through the base are apertures 9 for receiving bolts or other fastening means (not shown), whereby the lathe may be clamped to the top of a work bench or other support.

Mounted on the base 6, is an upright post 10 having a head 11 provided with a centrally located threaded aperture for receiving a vertically disposed clamping screw 12. The lower end of the clamping screw 12 extends into a centrally located socket (not shown) formed in the top of a bridge 13 forming a movable jaw which extends longitudinally of the stationary jaw 7. The jaws 13 and 7 coact to form an adjustable bearing for rotatably supporting the valve 3. Formed in the opposed faces of the jaws, are longitudinally extending V-shaped grooves 14 for receiving the valve stem. The arrangement of the movable jaw 13 and clamping screw 12 permits the application of equal pressure to both ends of the valve stem.

The feed screw 2 extends through a threaded aperture formed in the upper end of a bracket 16, which is adjustably mounted in a guideway 17 arranged at one end of the base 6. Formed in the bracket 16 near the lower end thereof, is a longitudinally extending slot 18 slidably engaging a bolt 19, which extends into a threaded aperture in the base for clamping the bracket in any of its adjusted positions. The adjustment of the bracket 16 permits the feed screw to be shifted radially of the valve at substantially right angles to the axis of the bearing, so that the feed screw may be shifted into axial alinement with the valve stem, and with the adjustable bearing formed by the jaws 7 and 13. In order to insure against cutting of the valve face 21 beyond the required depth, there is provided a stop 22 for limiting the inward axial movement of the valve under the action of the feed screw. In the form shown, the stop 22 comprises a pin disposed in substantially parallel spaced relation to the valve stem and seated in an aperture extending through one of the legs of the U-shaped jaw 7. The stop pin 22 is axially adjustable for varying the depth of the cut made in the valve face, and is secured in any of its adjusted positions by a set screw 23.

The tool holder 5 comprises a head 24 pivotally connected to the base 6 by a pin 25. Formed at the bottom of the head is a projecting part or arm 26, which carries a bolt 27 projecting downwardly through an arcuate slot 28 formed in the base. The arrangement of the arcuate slot provides for the accurate adjustment of the holder to permit the cutting tool to be shifted to the desired angular position with respect to the valve head. The lower end of the bolt 27 is provided with a wing nut 29 for clamping the holder in any of its angularly adjusted positions. Carried at the upper end of the holder 5, is a movable jaw 30 secured to the head 24 by a screw 31. One end of the jaw 30 is arranged to clamp the cutting tool 4 to a seat 32 formed in the top face of the head 24, and located so as to support the tool at a point below the axis of the valve. The seat 32 is adapted to support a cutting tool of any desired shape, but in the form shown, the cutting tool is of octagonal shape and reversible so as to provide sixteen cutting edges.

The means for rotating the valve is shown in the form of a crank handle 33, having an aperture 34 for receiving the outer end of the valve stem, and a set screw 35 which is arranged for clamping the crank to the valve stem.

In operation, the valve to be faced is placed in the lathe with its stem rotatably supported between the jaws 7 and 13, and the valve head located between the feed screw 2 and stop pin 22. The clamping screw 12 is then adjusted to bring the movable jaw 13 into proper contact with the valve stem. The stop pin 22 is adjusted to control the depth of the cut, and the bracket 16 is then shifted to locate the feed screw in axial alinement with the valve stem. By moving the feed screw inwardly, the valve is shifted axially inward until the valve face 21 is brought into engagement with the cutting tool. While the valve is being manually rotated by the crank 33, the valve head may be gradually fed to the cutting tool by the feed screw.

Although but one specific embodiment of this invention has been herein shown and described it will be understood that numerous details of the construction shown may be altered or omitted without departing from the spirit of this invention as defined by the following claims.

I claim:

1. A valve lathe comprising a body having a bearing member for rotatably supporting a valve to be faced, a feed screw arranged on said body for shifting the valve axially into engagement with a cutting tool supported on said body, and a stop mounted on said body for limiting the axial movement of the valve under the action of said feed screw, said stop being adjustable axially with respect to said bearing.

2. A valve lathe comprising a body having a bearing member for rotatably supporting a valve to be faced, a feed screw arranged on said body for shifting the valve axially into engagement with a cutting tool supported on said body, said body having an aperture formed therein, and a pin seated in said aperture and disposed in substantially parallel spaced relation to the axis of said bearing, said pin being arranged for axial adjustment to limit the axial movement of the valve under the action of said feed screw.

Signed at Chicago this 3rd day of November 1921.

CHARLES G. TURNGREN.